United States Patent
Watarai

[11] Patent Number: 5,903,214
[45] Date of Patent: May 11, 1999

[54] BICYCLE DISPLAY APPARATUS

[75] Inventor: Etsuyoshi Watarai, Izumi, Japan

[73] Assignee: Shimano, Inc., Osaka, Japan

[21] Appl. No.: 08/881,144

[22] Filed: Jun. 24, 1997

[30] Foreign Application Priority Data

Jul. 23, 1996 [JP] Japan ................... H8-211944

[51] Int. Cl.$^6$ ................... B62J 3/00; B60Q 1/00
[52] U.S. Cl. ............... 340/432; 340/456; 340/461; 340/525; 200/61.85; 200/61.88; 200/61.91; 324/207.2; 324/207.25; 74/473 R
[58] Field of Search ................... 340/432, 456, 340/525, 461, 462; 200/61.85, 61.88, 61.91; 324/207.13, 207.2, 207.25, 260; 74/473 R, 488, 491, 551.1, 501.6

[56] References Cited

U.S. PATENT DOCUMENTS

| | | | |
|---|---|---|---|
| 4,037,196 | 7/1977 | Atkinson et al. | 340/456 |
| 5,552,761 | 9/1996 | Kazyaka | 340/456 |
| 5,625,336 | 4/1997 | Yamamoto | 340/432 |

FOREIGN PATENT DOCUMENTS

| | | | |
|---|---|---|---|
| 647556 A2 | 4/1995 | European Pat. Off. | |
| 4236228 | 4/1994 | Germany | 340/456 |
| 2128027 | 11/1984 | United Kingdom | 340/456 |
| 2277784 | 11/1994 | United Kingdom | 340/456 |

*Primary Examiner*—Donnie L. Crosland
*Attorney, Agent, or Firm*—James A. Deland

[57] ABSTRACT

A display apparatus for a bicycle includes a movable member that changes position in accordance with the state of a bicycle transmission, a sensor that detects the position of the movable member without contacting the movable member, and a display mechanism operatively coupled to the sensor for displaying indicia corresponding to a state of the bicycle transmission.

18 Claims, 5 Drawing Sheets

BICYCLE DISPLAY APPARATUS

BACKGROUND OF THE INVENTION

The present invention is directed to a bicycle display apparatus and, more particularly, to a display apparatus that can be attached to a movable component of an existing bicycle.

Display devices that display the shift position of a bicycle transmission by means of the position of an indicator needle, a rotating disk, or another such movable component have existed for some time. For instance, FIG. 7 is an example of a conventional display apparatus that indicates the shift position of a bicycle transmission. A shift knob 3 is attached so as to allow rotational operation to a position next to the grip 2 attached to the end of the right handlebar 1. Rotating the shift knob 3 operates the bicycle transmission via a gear change cable 4. The shift position of the bicycle transmission can be confirmed by means of a display device 5 whose display changes in conjunction with the shift knob 3.

FIG. 8 is a diagram of the members that make up the display device 5. A rotating disk 51 is provided inside the display device 5, and the rotating disk 51 rotates in conjunction with the rotation of the shift knob 3. However, the rotational axis of the rotating disk 51 is roughly perpendicular to the rotational axis of the shift knob 3. A plurality of detents corresponding to the shift positions are provided in the rotation of the shift knob 3. A plurality of numerals that indicate the shift position of the bicycle transmission are provided to the surface of the rotating disk 51, and the specific numeral corresponding to the detent position of the shift knob 3 can be seen through a window 53 provided to a panel 52.

FIG. 9 is another example of a conventional display apparatus that indicates the shift position of a bicycle transmission. With this example, the bicycle transmission is operated and the shift position is changed via the gear change cable 4 by means of a shift lever 31 instead of a shift knob. A display device 7 is provided at an intermediate position of the gear change cable 4.

FIG. 10 is a cross sectional view of the structure of the display device 7. The center portion of the outer cable 41 of the gear change cable 4 is removed, but the outer cable 41 is connected to a cylinder member 71 by a connection member 73, and the removed portion in the center of the outer cable 41 is covered by the cylinder member 71. The cylinder member 71 is made of a transparent material, and a display scale 72 is engraved into the outer surface thereof. An indicator member 74 is engaged by frictional force to the inner cable 42 of the gear change cable 4, and it moves in conjunction with the movement of the inner cable 42. The rider can confirm the current shift position of the bicycle transmission from the positional relationship between the indicator member 74 and the display scale 72.

Because the display component is small with a conventional mechanical display apparatus that uses a movable component, some riders feel the display is difficult to read. This problem is particularly pronounced at night. Also, the display configuration and the like of the display apparatus may not necessarily meet the requirements of the rider, and even if a rider does not like this display apparatus and wants to replace it, such replacement is not necessarily possible.

SUMMARY OF THE INVENTION

The present invention is directed to a bicycle display apparatus that is capable of providing a display that is easy to read, which can be attached to an existing movable component such as an existing speed indicator, and which can be freely replaced according to the preferences of the rider. In one embodiment of the present invention, a display apparatus for a bicycle includes a movable member that changes position in accordance with the state (e.g., a shift position) of a bicycle transmission, a sensor that detects the position of the movable member without contacting the movable member, and a display mechanism operatively coupled to the sensor for displaying indicia corresponding to a state of the bicycle transmission. If desired, the movable member may include a magnet, and the sensor may include a magnetic sensor.

In a more specific embodiment, the apparatus includes a housing having a cable entry opening, a cable exit opening and an exposed intermediate opening. In this embodiment, the movable member includes an inner cable that slides within an outer casing, wherein a first segment of the outer casing is fitted to the cable entry opening, a second segment of the outer casing is fitted to the cable exit opening, and the inner cable passes through the cable entry opening, past the intermediate opening and through the cable exit opening. In this case a magnet may be attached to the inner cable and the sensor may comprise a magnetic sensor.

In another embodiment of the present invention, a rotating disk ordinarily used in an existing gear indicator is rotatably supported within a housing. Similar to the embodiment described immediately above, a magnet may be attached to the rotating disk and the sensor may comprise a magnetic sensor.

DETAILED DESCRIPTION OF THE EMBODIMENTS

Figure 1:
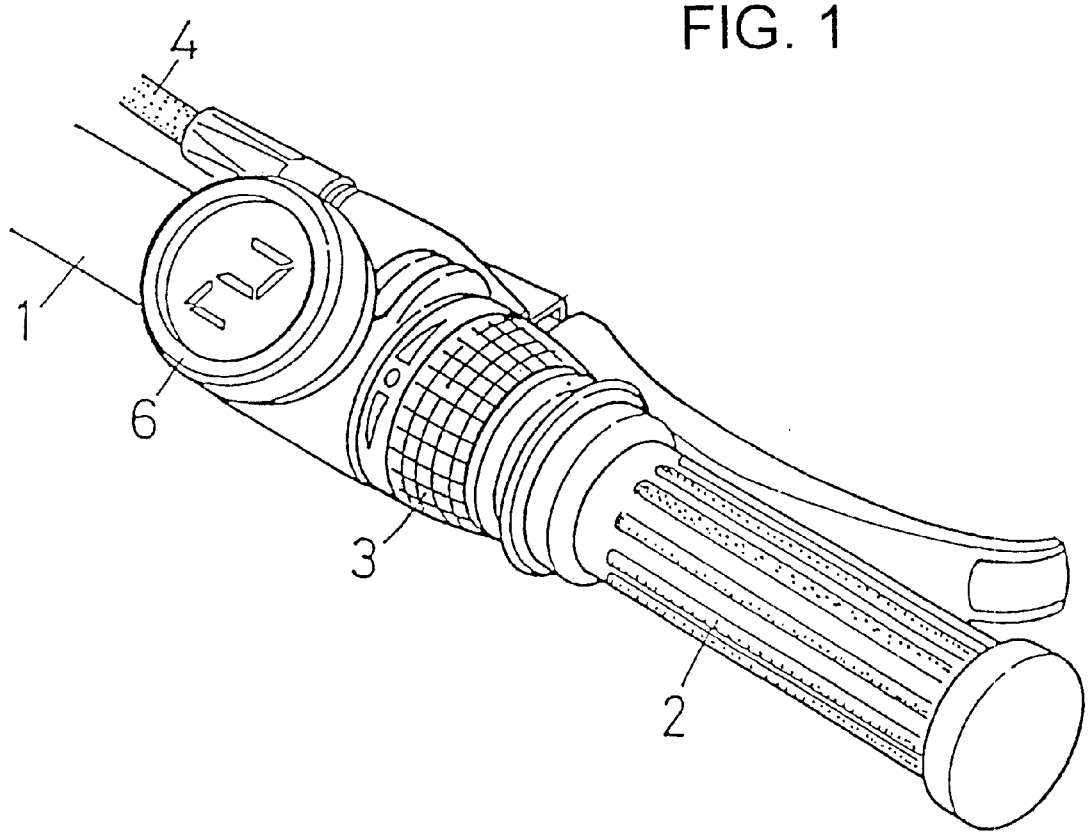
FIG. 1 is an oblique view of a particular embodiment of a bicycle display apparatus according to the present invention.
Figure 7:
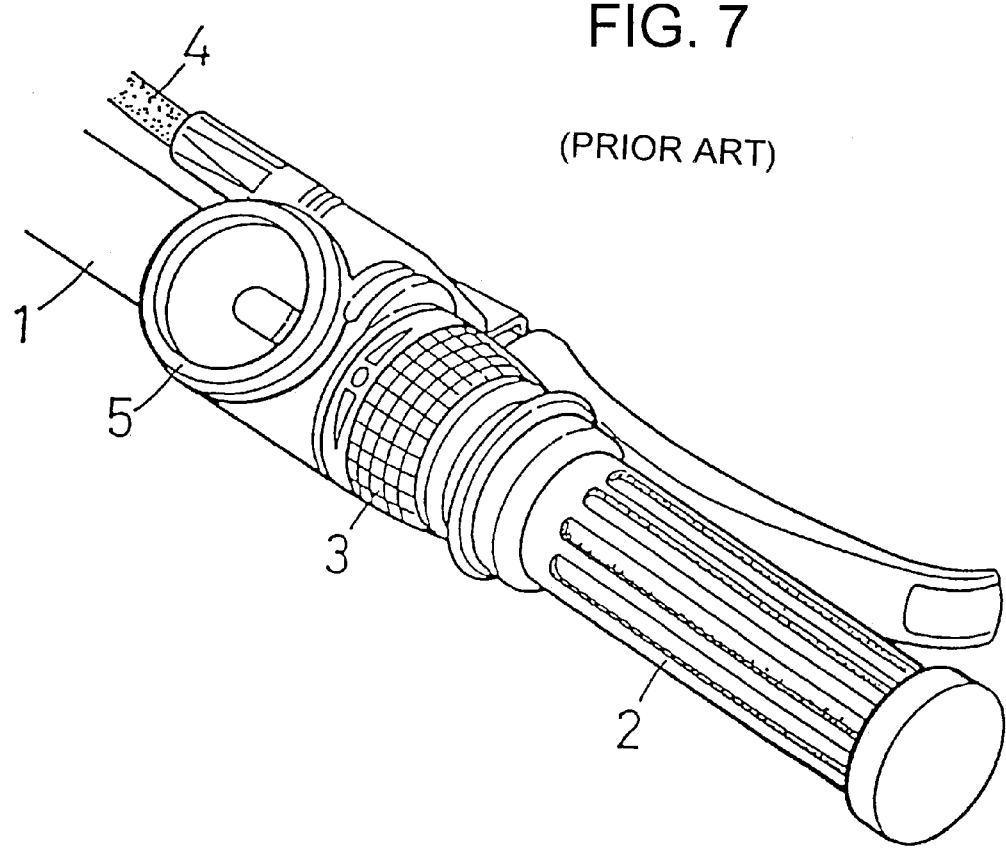
FIG. 7 is an oblique view of a conventional bicycle display apparatus.
Figure 8:
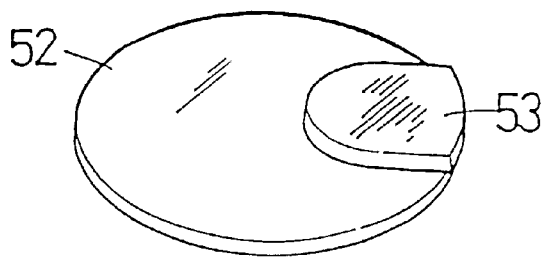
FIG. 8 is an exploded view of the relevant elements in the bicycle display apparatus shown in FIG. 7.
Figure 8:
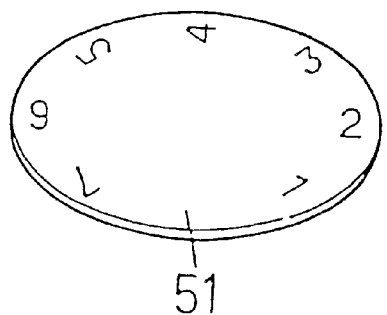
Figure 9:
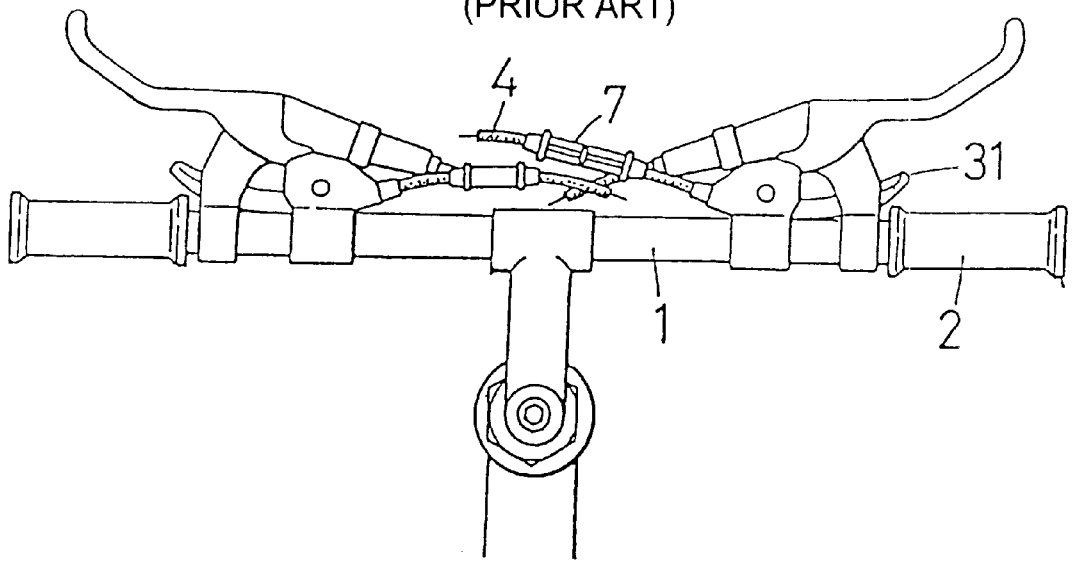
FIG. 9 is a top view of another conventional bicycle display apparatus.

FIG. 1 is an oblique view of a particular embodiment of a bicycle display apparatus 6 according to the present invention that can be simply attached to the top of the display device 5 shown in FIG. 7. The entire upper surface of the display apparatus 6 consists of a display panel, so the display is large and easy to read. Also, if a light emitting diode or another such luminescent element is used as the display element, then the display will be easy to read even at night.

Figure 2:
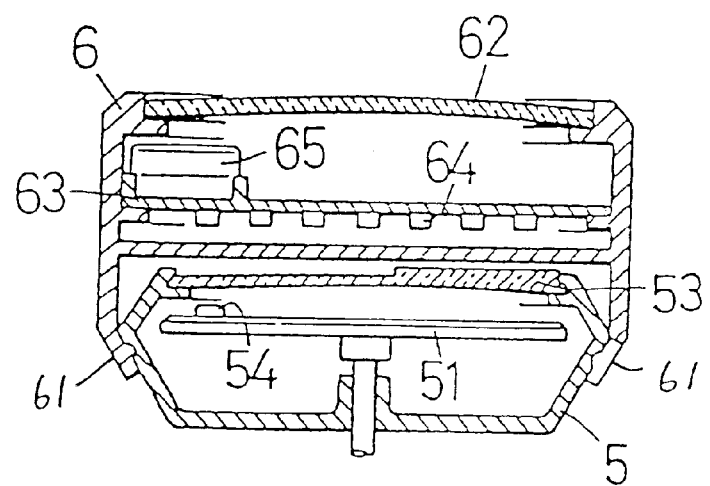
FIG. 2 is a cross sectional view of the display apparatus shown in FIG. 1.

FIG. 2 is a cross sectional view of the structure of the display apparatus 6. The display apparatus 6 is detachably attached to the display device 5 by attachment tabs 61 that have elasticity. The display apparatus 6 can be attached to the display device 5 by being firmly pressed, and the display apparatus 6 can be taken off by being firmly pulled. In the case of the present invention, a permanent magnet 54 is fixed at a specific position on the outer peripheral side of the rotating disk 51 inside the display device 5. All other aspects of the structure of the display device 5 are the same as in FIG. 7, and when the display apparatus 6 is removed, the display device 5 has the same display function as in FIG. 7.

As shown in FIG. 2, a circuit board 63 is provided to the interior of the display apparatus 6, and a plurality of magnetic sensors 64 are provided to specific positions on the circuit board 63. Hall elements, lead switches, or the like can be utilized as the magnetic sensors 64. A battery 65 is installed on the circuit board 63 for supplying power to a display panel 62 and to the circuit on the circuit board 63. The display panel 62 occupies the entire upper surface of the display apparatus 6, and it displays a numeral that indicates the shift position of the bicycle transmission by means of a seven-segment display element. A light emitting diode, a liquid crystal display panel, or the like can be utilized as the display element of the display panel 62. In the case of a liquid crystal display panel, visibility at night will be good if a lighting element is provided. The outer surface of the display panel 62 is protected by a transparent protector plate.

When the shift knob 3 is rotated and the bicycle transmission operated, the rotating disk 51 rotates in conjunction with the rotation of the shift knob 3 and stops at a rotational position corresponding to the rotational position of the shift knob 3. Since the rotational position of the rotating disk 51 can be determined by detecting the position of the permanent magnet 54 by means of the plurality of the magnetic sensors 64, the shift position of the bicycle transmission can be determined and displayed on the display panel 62.

Figure 3:
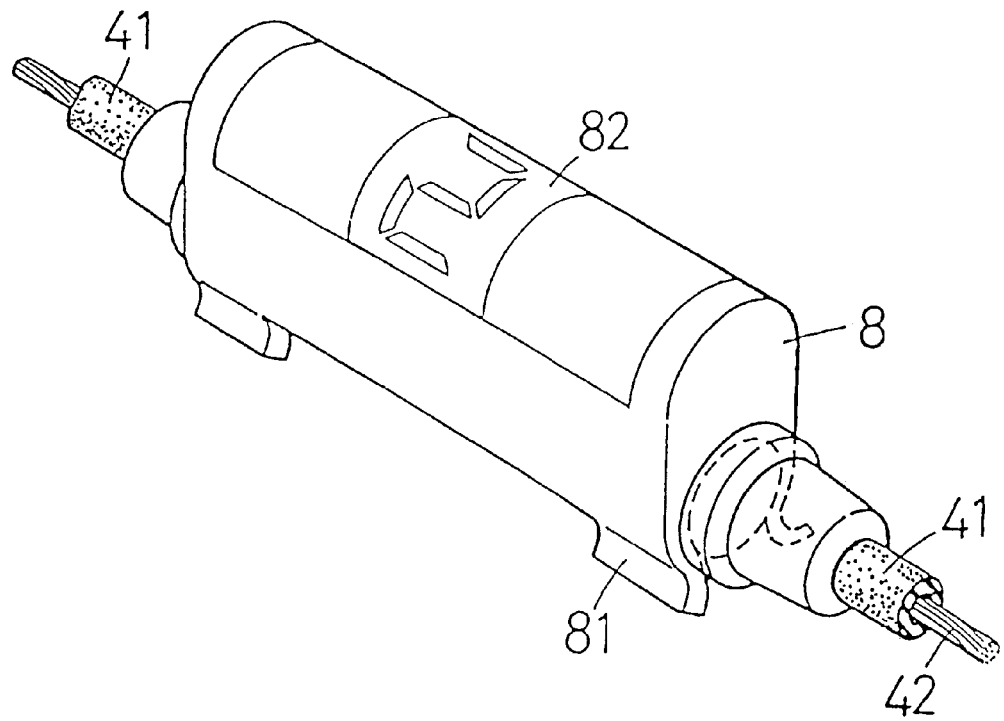
FIG. 3 is an oblique view of an alternative embodiment of a bicycle display apparatus according to the present invention.
Figure 10:
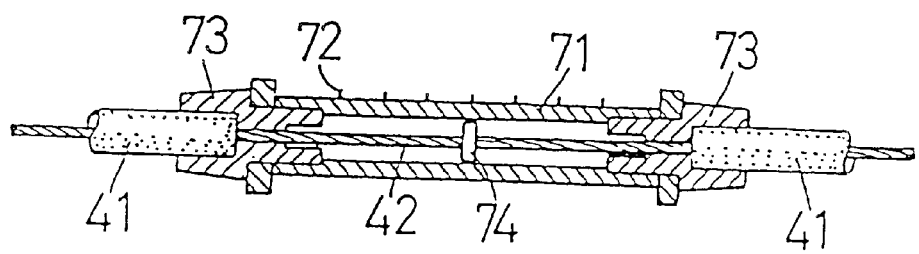
FIG. 10 is a cross secitonal view of the display apparatus shown in FIG. 9.

FIG. 3 is an oblique view of an alternative embodiment of a bicycle display apparatus 8 according to the present invention that can be simply attached to the top of the display device 7 shown in FIG. 10. The display apparatus 8 has a semicircular body that covers the upper portion of the outer surface of the display device 7. Also, a display panel 82 that allows the upper surface of this body to be utilized to its full potential is provided. The display is therefore large and easy to read. Also, if a light emitting diode or another such luminescent element is used as the display element, then the display will be easy to read even at night. The display apparatus 8 is detachably attached to the display device 7 by attachment tabs 81 that have elasticity. The display apparatus 8 can be attached to the display device 7 by being firmly pressed, and the display apparatus 8 can be taken off by being firmly pulled.

Figure 4:
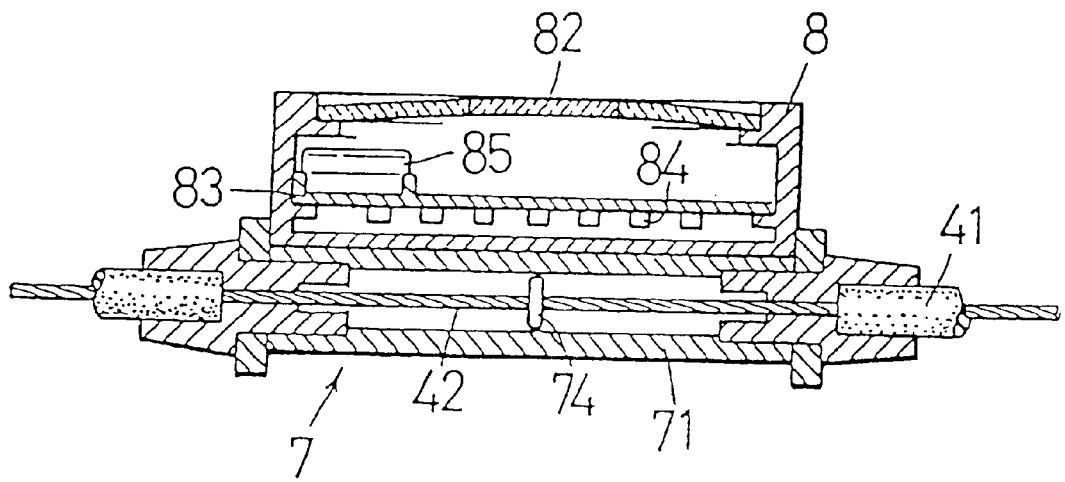
FIG. 4 is a cross sectional view of the display apparatus shown in FIG. 3.

FIG. 4 is a cross sectional view of the structure of the display apparatus 8. In the case of the present invention, the indicator member 74 that engages by frictional force with the inner cable 42 inside the display device 7 consists of a permanent magnet. All other aspects of the structure of the display device 7 are the same as in FIG. 10, and when the display apparatus 8 is removed, the display device 7 has the same display function as in FIG. 10. When the rider operates the shift lever 31, the indicator member 74 moves in conjunction with the inner cable 42 of the gear change cable 4.

A circuit board 83 is provided to the interior of the display apparatus 8, and a plurality of magnetic sensors 84 are provided to specific positions on the circuit board 83. Hall elements, lead switches, or the like can be used as the magnetic sensors 84. A battery 85 is installed on the circuit board 83 for supplying power to a display panel 82 and to the circuit on the circuit board 83. The display panel 82 is provided so that the upper surface of the display apparatus 8 can be utilized to its full potential, and it displays a numeral that indicates the shift position of the bicycle transmission by means of a seven-segment display element. A light emitting diode, a liquid crystal display panel, or the like can be utilized as the display element of the display panel 82. In the case of a liquid crystal display panel, visibility at night will be good if a lighting element is provided.

When the rider operates the shift lever 31, the indicator member 74 (made from a permanent magnet) moves in conjunction with the inner cable 42 of the gear change cable 4 and stops at a position corresponding to the shift position. Since the position of the indicator member 74 can be detected by the plurality of the magnetic sensors 84, the shift position of the bicycle transmission can be determined and displayed on the display panel 82.

Figure 5:
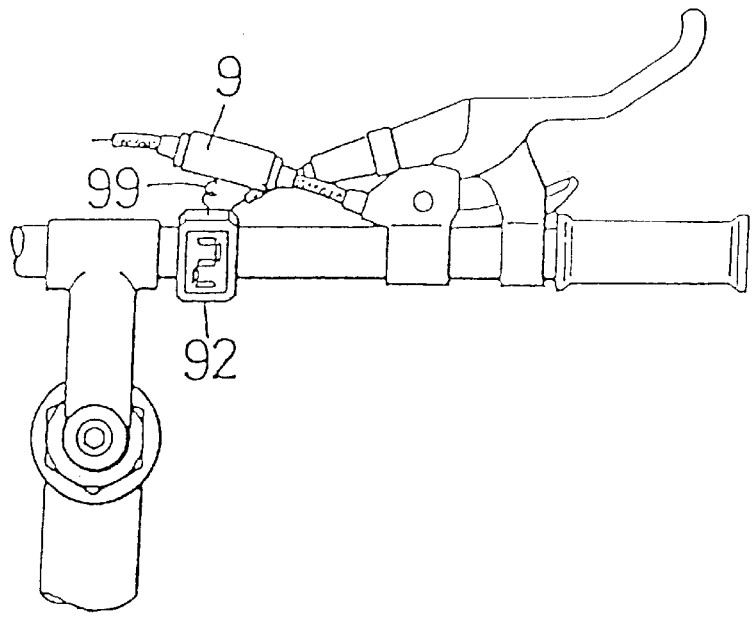
FIG. 5 is a top view of an alternative embodiment of a bicycle display apparatus according to the present invention.

FIG. 5 is an overall view of the bicycle display apparatus in the third embodiment of the present invention. Because of its configuration, the display apparatus 8 shown in FIG. 4 inevitably has a small display panel which may be difficult to read for some riders. Accordingly, in this embodiment, the display panel 82 of the display apparatus 8 shown in FIGS. 3 and 4 is provided separately, with the display panel being attached independently and at a different position. A detection apparatus 9 has a structure in which the display panel 82 is excluded from the display apparatus 8, and it has the function of detecting the position of the indicator member 74. A display panel 92 is provided separately from the detection apparatus 9, and it is connected to the detection apparatus 9 by a cable 99. The display panel 92 displays a numeral that indicates the shift position of the bicycle transmission by means of a display signal from the detection apparatus 9. The display panel 92 has a large display surface area and is easy to read. Also, the display panel 92 can be attached at a position that is easy for the rider to see, such as the handlebar 1.

Figure 6:
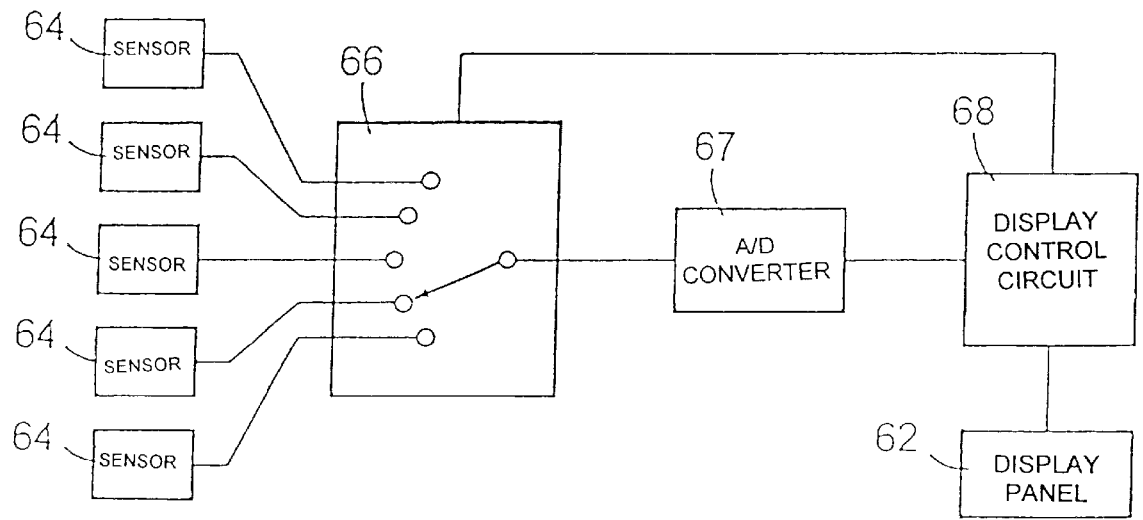
FIG. 6 is a schematic diagram of the electronic components that make up any of the bicycle display apparatus according to the present invention.

FIG. 6 is a block diagram of the electronic components included in the circuit board 63 of the display apparatus 6. This circuit can also be used in the display apparatus and detection apparatus of the other embodiments. A plurality of the magnetic sensors 64 are provided, and the output of each is inputted to an analog/digital conversion circuit 67 via a switch 66 that works off a semiconductor switch. A display control circuit 68 controls the switch 66, the output of the plurality of magnetic sensors 64 is sequentially scanned, converted into a digital value by the analog/digital conversion circuit 67, and detected. The output of the magnetic sensors 64 with the largest value can be determined and the position of the permanent magnet 54 detected. On the basis of these detection results, the display apparatus displays a numeral that indicates the shift position of the bicycle transmission.

While the above is a description of various embodiments of the present invention, further modifications may be employed without departing from the spirit and scope of the present invention. For example, magnetic sensors were used as the non-contact sensors with the above embodiments, but an optical sensor or any other non-contact sensor can be used instead. Also, the shift position of the bicycle transmission was displayed in the above embodiments, but the present invention can also be applied to a speed display by embedding a permanent magnet in a needle type of speedometer of the like, for example. Furthermore, the display configuration is not limited to a digital display of numerals. The display configuration can also be a bar graph display, a pie graph display, or a display of any other configuration. Thus, the scope of the invention should not be limited by the specific structures disclosed. Instead, the true scope of the invention should be determined by the following claims.

What is claimed is:

1. A display apparatus for a bicycle having a first housing including a movable member that changes position in accordance with the state of a bicycle transmission, wherein the apparatus comprises:
   a second housing;
   a fastener for removably attaching the second housing to the first housing;
   a sensor disposed in the second housing wherein the sensor detects the position of the movable member without contacting the movable member; and
   a display mechanism operatively coupled to the sensor for displaying indicia corresponding to a state of the bicycle transmission.

2. The apparatus according to claim 1 wherein the sensor comprises a magnetic sensor.

3. The apparatus according to claim 1 wherein the display displays a numeral corresponding to a shift position of the bicycle transmission.

4. The apparatus according to claim 1 wherein the fastener comprises an attachment tab for removably attaching the second housing to the first housing.

5. The apparatus according to claim 1 wherein the sensor is disposed within the second housing.

6. A display apparatus for a bicycle comprising:
   a first housing;
   a movable member disposed in the first housing, wherein the movable member changes position in accordance with the shift position of a bicycle transmission;
   a second housing;
   a fastener for removably attaching the second housing to the first housing;
   a sensor coupled to the second housing and removable therewith, wherein the sensor detects the position of the movable member without contacting the movable member; and
   a display mechanism operatively coupled to the sensor for displaying shift position indicia corresponding to a shift position of the bicycle transmission.

7. The apparatus according to claim 6 wherein the movable member comprises a magnet, and wherein the sensor comprises a magnetic sensor.

8. The apparatus according to claim 6 wherein the display displays a numeral corresponding to the shift position of the bicycle transmission.

9. The apparatus according to claim 6 wherein the movable member comprises a cable for controlling the bicycle transmission.

10. The apparatus according to claim 6 wherein the first housing includes a cable entry opening, a cable exit opening and an exposed intermediate opening, and wherein the movable member comprises:
    an inner cable that slides within an outer casing;
    wherein a first segment of the outer casing is fitted to the cable entry opening;
    wherein a second segment of the outer casing is fitted to the cable exit opening; and
    wherein the inner cable passes through the cable entry opening, past the intermediate opening and through the cable exit opening.

11. The apparatus according to claim 10 wherein the movable member further comprises a magnet attached to the inner cable, and wherein the sensor comprises a magnetic sensor.

12. The apparatus according to claim 10 wherein the sensor and the display mechanism are disposed within the second housing.

13. The apparatus according to claim 12 wherein the fastener comprises an attachment tab for removably attaching the second housing to the first housing.

14. The apparatus according to claim 6 wherein the movable member comprises a rotating disk.

15. The apparatus according to claim 14 wherein the rotating disk is rotatably supported within the first housing.

16. The apparatus according to claim 15 wherein the movable member further comprises a magnet attached to the rotating disk, and wherein the sensor comprises a magnetic sensor.

17. The apparatus according to claim 16 wherein the sensor and the display mechanism are disposed within the second housing.

18. The apparatus according to claim 17 wherein the fastener comprises an attachment tab for removably attaching the second housing to the first housing.

* * * * *